United States Patent [19]

Dragotta et al.

[11] Patent Number: 4,744,455
[45] Date of Patent: May 17, 1988

[54] DISPENSER AND COMPONENT FEEDER

[75] Inventors: Peter J. Dragotta, 4 Bodie Rd., Wayne, N.J. 07470; Robert D. Mitchell, Oakland, N.J.

[73] Assignee: Peter J. Dragotta, Wayne, N.J.

[21] Appl. No.: 936,449

[22] Filed: Dec. 1, 1986

[51] Int. Cl.$^4$ .............................................. B65G 47/24
[52] U.S. Cl. .................................. 198/389; 198/396; 198/468.4; 198/468.6; 198/550.2; 221/172; 221/290
[58] Field of Search ............ 198/389, 396, 409, 468.4, 198/468.6, 466.1, 550.2, 582 ; 221/171, 172, 290, 298

[56] References Cited

U.S. PATENT DOCUMENTS

| | | | |
|---|---|---|---|
| 1,947,610 | 2/1934 | McNamara | 198/403 X |
| 3,229,804 | 1/1966 | Anderson | 198/389 |
| 3,361,296 | 1/1968 | Whiteman | 221/172 |
| 3,367,015 | 2/1968 | Brosene, Jr. | 198/389 X |
| 3,373,785 | 3/1968 | Anderson | 198/389 X |
| 3,578,142 | 5/1971 | Burgess, Jr. | 221/171 X |
| 3,877,569 | 4/1975 | Shields | 198/403 X |
| 3,884,347 | 5/1975 | Gallagher et al. | 198/389 X |
| 4,122,975 | 10/1978 | Lowery et al. | 198/389 X |
| 4,182,030 | 1/1980 | Mullins | 198/389 X |
| 4,461,380 | 7/1984 | Grikis | 198/389 |

FOREIGN PATENT DOCUMENTS

| | | | |
|---|---|---|---|
| 1502848 | 8/1971 | Fed. Rep. of Germany | 198/409 |
| 60-255344 | 12/1985 | Japan | 221/172 |
| 1088184 | 10/1967 | United Kingdom | 198/409 |

Primary Examiner—Joseph E. Valenza
Assistant Examiner—Jonathan D. Holmes
Attorney, Agent, or Firm—Daniel H. Bobis

[57] ABSTRACT

A dispenser and component feeder for integration with automated assembly equipment is adapted for the high speed placement of self-orienting components of varying sizes and includes, a linear vibratory chute for transferring the self-orienting components from the storage hopper to an adjustable single roller feed assembly where the self-orienting components are conveyed to a pick-up position, the single roller feed assembly having a roller to facilitate in conveying the self-orienting components, and alternately reciprocating rod members to segregate a self-orienting component at the pick-up position. A pick-up and placement assembly is operative to pick-up the segregated self-orienting component from the pick-up position and move the same to a position for placement on an associated conveyor on the automated assembly equipment.

15 Claims, 11 Drawing Sheets

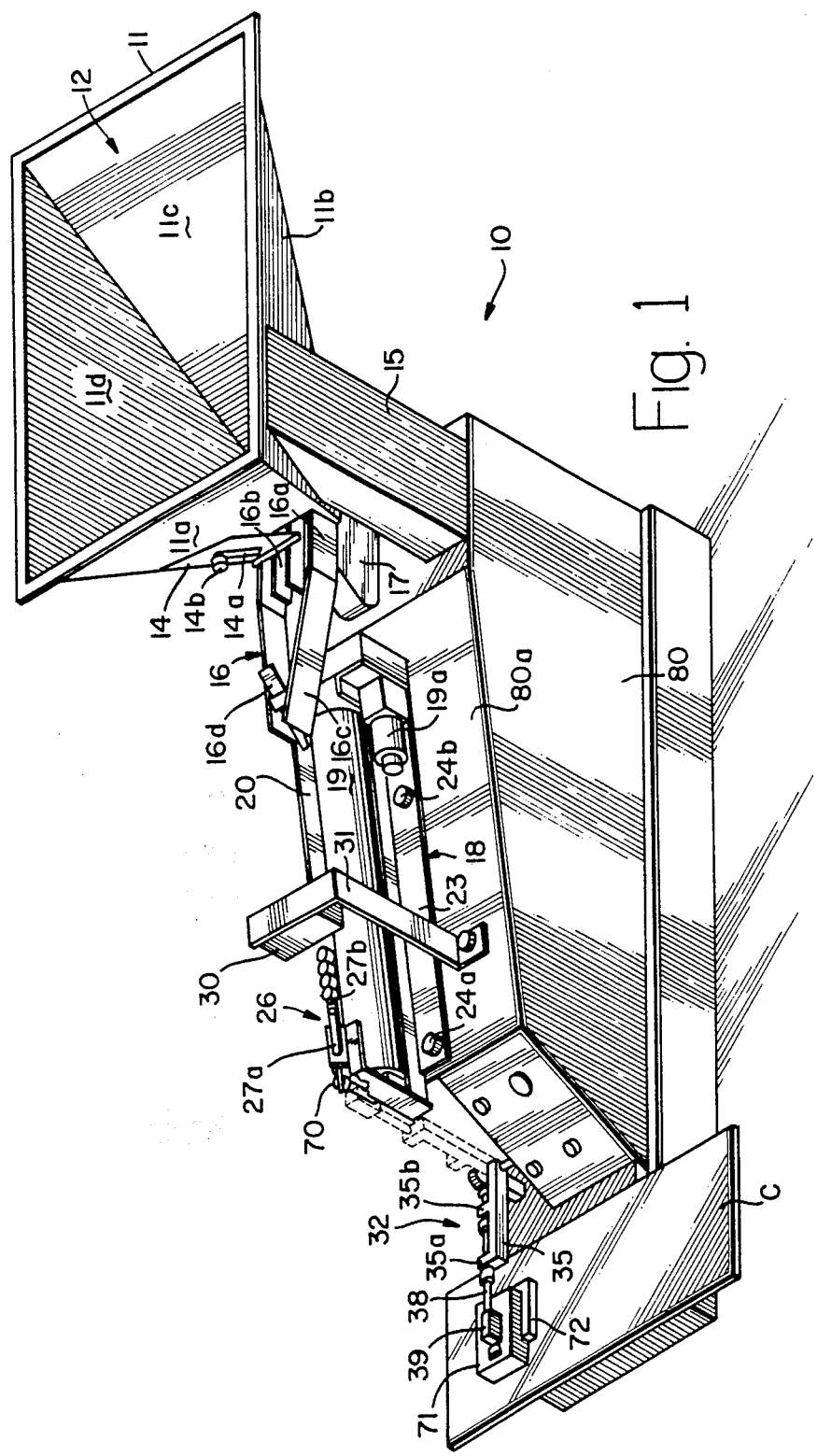

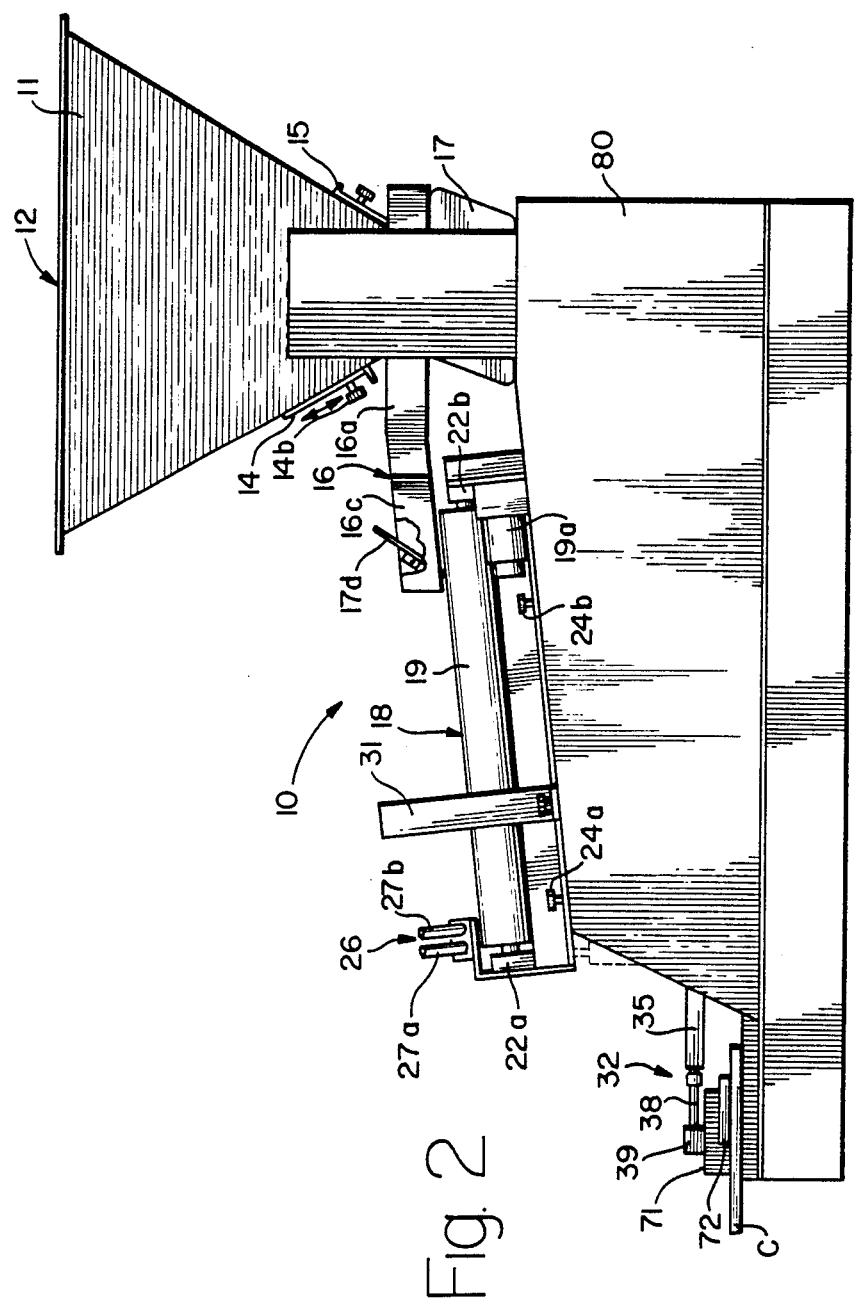

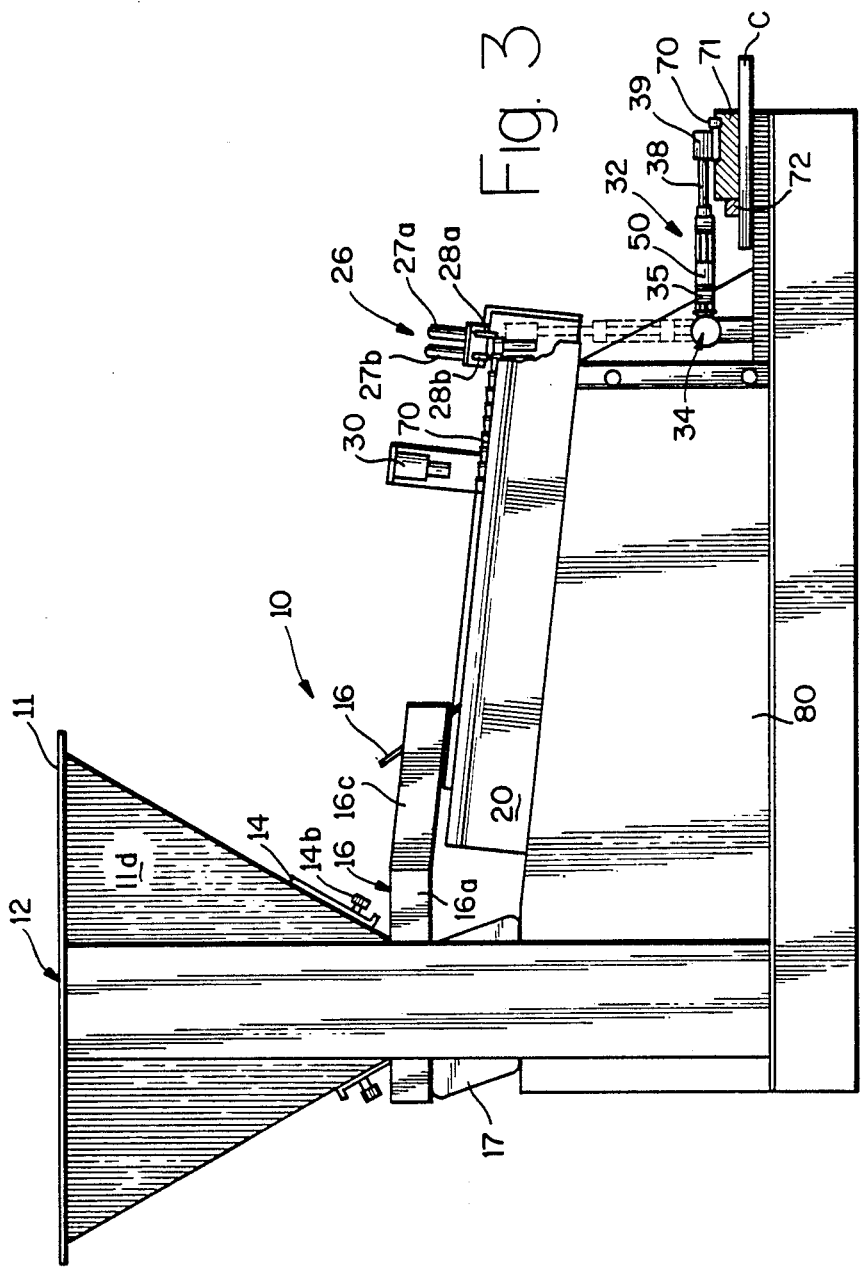

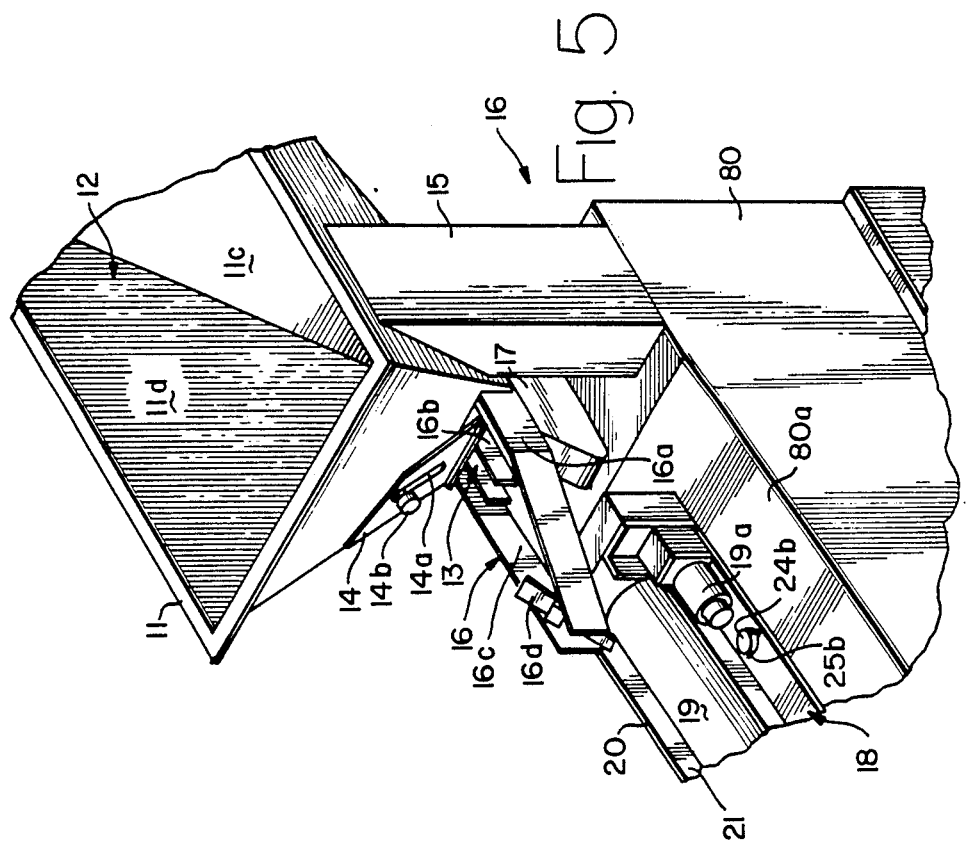
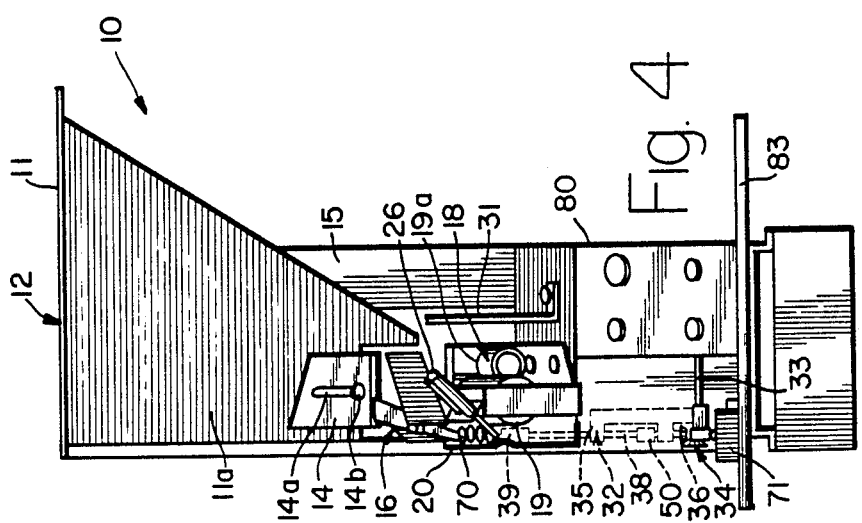

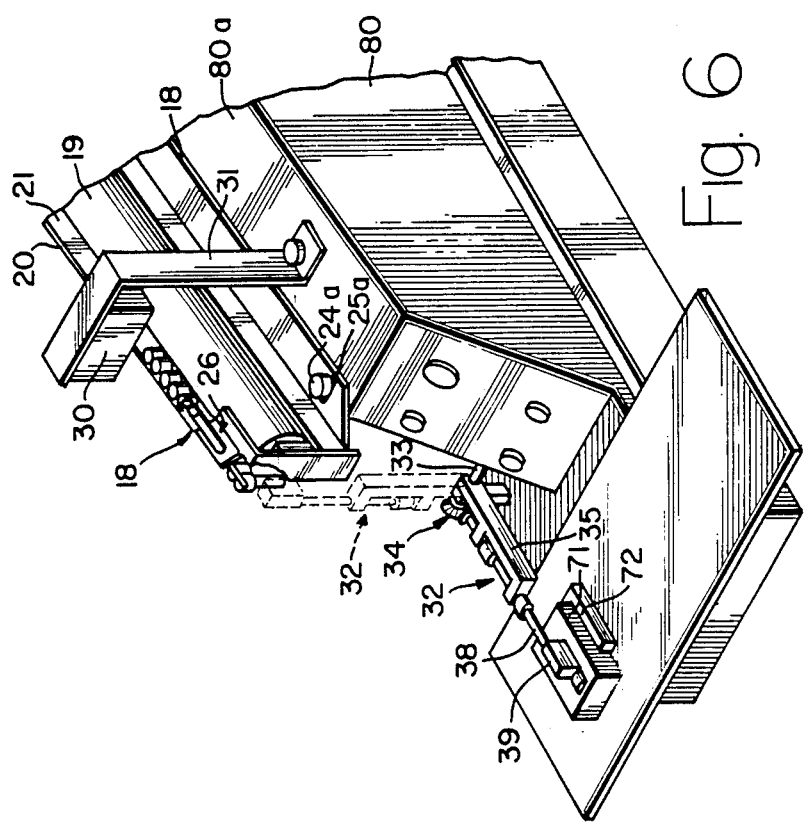

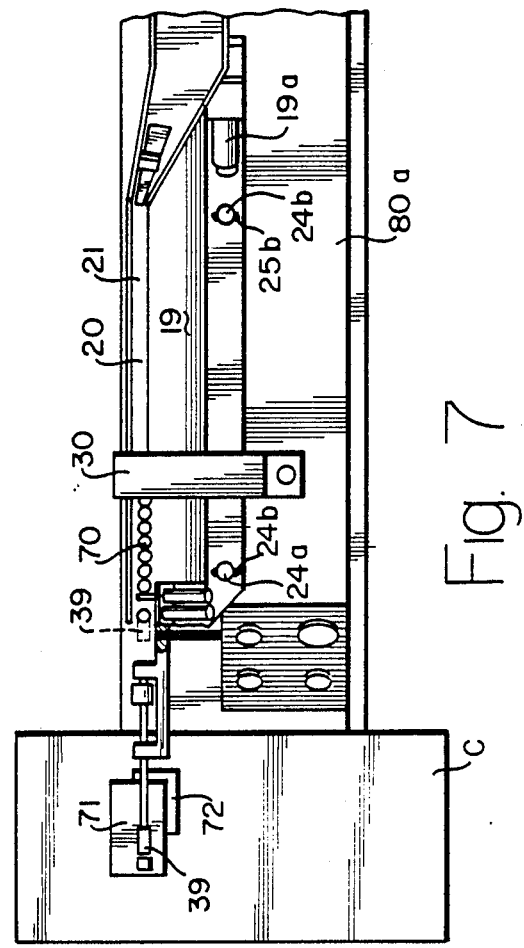

DISPENSER AND COMPONENT FEEDER

BACKGROUND OF THE INVENTION

This invention relates generally to packaging and assembling machinery and more particularly to allied machinery which is disposed to store, to feed, to convey or transfer and to position headed components of varying sizes and shapes into a package or product assembly which is disposed on an associated high speed conveying system.

It is known in the prior art that machinery can be used for storing and conveying components, for storing, conveying, sizing and distributing components, and machines have also been used for holding, turning and depositing components for various purposes.

U.S. Pat. No. 3,743,091 for example shows a machine for storing a quantity of headed components such as screws in a feed bowl with a helical feeding ramp and orienting slot for transferring these headed components from the feed bowl to a feed conveyor which in turn delivers the units to a sorting apparatus. The feed conveyor consists of two spaced parallel guide rails which form a feed path down which the screws may slide under the influence of gravity. Further, the upper end of the feed path formed by the parallel guide rails communicates with the orienting discharge ramp of the feed bowl and the output or remote end of the parallel guide rails defines a gauging or sorting station. In this machine, the feed bowl is subjected to vibratory motion so that when the headed screws are properly oriented in the discharge ramp, the vibratory energy transmitted to the screws will cause them to move down the feed path formed by the parallel guide rails. Adjustment screws are provided to move at least one of the guide rails to vary the width of the slot down which the oriented headed components are moved, and thus can be sized to handle various sizes of headed devices.

U.S. Pat. No. 3,743,091 is also characterized by the fact that when the screws move down to the sorting section they are gauged by a suitable gauging system and then kicked in one or the other of the directions by a kicker assembly to sort the screws in accordance with the gauging.

In U.S. Pat. No. 1,947,609 a device is shown which is adapted to remove fabricated glass articles such as tumblers from the mold table and deliver them in an inverted position to a conveyor situated at a substantially different level.

U.S. Pat. Nos. 4,535,893, 3,743,091, and 1,313,990 provide a vibratory separation device for a component.

U.S. Pat. Nos. 2,146,617, 2,833,434, 4,364,467, 4,444,537, and 3,877,569 show picker and sorting arrangements and also show the rotation of parts during transfer from one part of the machine to another position.

The use of vacuum for holding the part during movement is shown in U.S. Pat. Nos. 3,587,888, 1,947,609, 3,913,724, 3,232,410, and 2,833,434.

These machines however are not adapted to meet the requirements of high speed automatic packaging, assembly and conveying systems such as the type that are used in the pharmaceutical, medical, electrical, and electronic industries.

The dispenser and component feeder in accordance with the present invention is particularly adapted for a marriage with automated high speed assembly equipment which makes it ideal for many component feeding, packaging, and assembly applications and operations.

The device, due to its simplicity, is relatively low in cost and is adapted to handle a wide range of headed components. Further, changeover for various sized components can be accomplished quickly by adjustment of the feed gap and replacement of the pick-up head to accommodate a particular component.

SUMMARY AND OBJECTS OF THE INVENTION

Thus, the present invention covers a dispenser and component feeder for the high speed placement of self-orienting headed components on associated automated packaging and assembly equipment which includes, a storage hopper having, an inlet means for charging quantities of the self-orienting headed component into the hopper means, and a controlled outlet means for discharging a predetermined number of the self-orienting components from the storage hopper, a transfer means disposed to communicate with the controlled outlet means at one end, and with a single roller conveying means at a spaced distance from the point of communication with the controlled outlet means. The single roller conveying means includes, a roller means, a guide wall adjacent the longitudinal length of the roller means, and means to adjust the roller means relative the guide wall to accommodate self-orienting headed components of various sizes, an escapement means is disposed for operative association with the end of the single roller conveying means remote from the transfer means which permits a headed component to be removed from the single roller conveying means, and a picking and positioning assembly adapted to hold and move the selected headed component and to position the same in packaging, assembly fixtures, and the like on associated automated assembly equipment.

Accordingly, it is an object of the present invention to provide an improved dispensing and component feeder for automated assembly equipment adapted to feed self-orienting headed components of varying sizes into packaging, sub-assemblies, assemblies, and fixtures on assembly machines and systems.

It is another object of the present invention to provide a dispenser and component feeder which has relatively simple construction, is relatively inexpensive to manufacture, and which offers high speed placement of self-orienting headed components into packaging, sub-assemblies, assembly fixtures and the like on associated automated assembly machines and equipment, with placement cycles as low as one to two seconds.

It is another object of the present invention to provide a dispensing and component feeding apparatus for use in packaging applications, or automated assembly machines, equipment and systems which can handle a wide range of self-orienting headed components of varying sizes in which changeover can be accomplished in a relatively short time.

With these and other objects in view the invention in accordance with the present application will be better understood in the description and claims when taken with the drawings as follows:

DESCRIPTION OF THE FIGURES

FIG. 1 is a perspective view of the dispenser and component feeder in accordance with the present invention in operative relation to the conveyor C, only a fraction of which is shown, of high speed automated packaging or assembly equipment.

FIG. 2 is a right side view of the dispenser and component feeder shown in FIG. 1 with the picking and positioning assembly shown in dotted lines in the up or engaged position with the component to be transferred to the packaging on the conveyor belt of the associated automated packaging equipment, and in solid lines in the down or disengaged position for positioning the component in the packaging on the conveyor of the associated automated packaging equipment.

FIG. 3 is a left side view of the dispenser and component feeder shown in FIG. 1 with the picking and positioning assembly shown in dotted lines in the up or engaged position with the component to be transferred to the packaging on the conveyor belt of the associated automated packaging equipment, and in the solid lines in the down or disengaged position for positioning the component in the packaging on the conveyor of the associated automated packaging equipment.

FIG. 4 is a front view of the dispenser and component feeder shown in FIG. 1 with the pick-up and placement arm shown in dotted lines in the up or engaged position with the component to be transferred to the conveyor belt of the associated automated packaging equipment, and in solid lines in the down or disengaged position for positioning the component in the packaging on the conveyor of the associated automated packaging equipment.

FIG. 5 shows a partial perspective view of the vibratory hopper and "quick dump" access door thereon and a fragment of the upper end of the associated single roller transfer assembly for the dispenser and component feeder shown in FIG. 1.

FIG. 6 shows a partial perspective view of the single roller transfer assembly with the associated pick-up and placement arm in dotted and solid lines to show the operation thereof.

FIG. 7 shows an enlarged top view of the single roller transfer assembly with the associated escapement means, and the pick-up and position assembly.

DESCRIPTION OF A PREFERRED EMBODIMENT OF THE INVENTION

Figure 9:
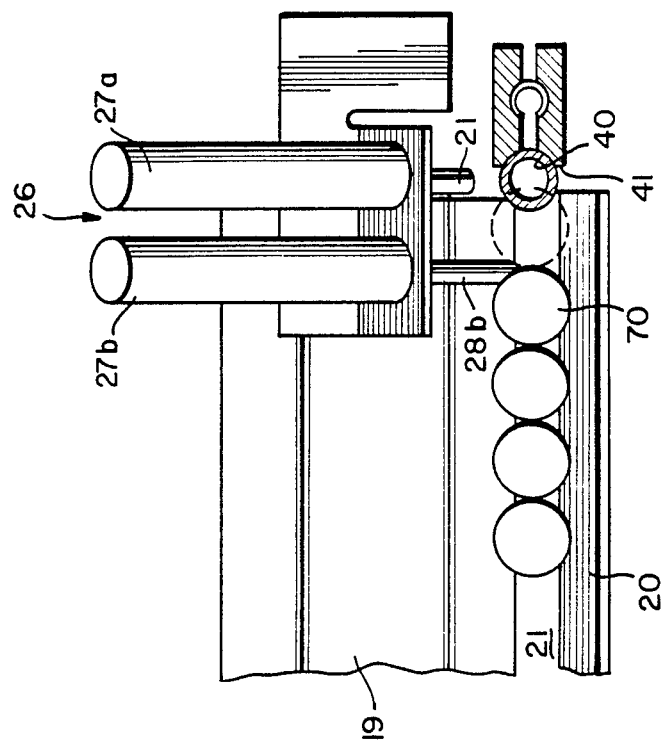
FIG. 9 is an enlarged top view in partial vertical section of the escapement means with the pick-up and place head in the engaged position.

FIGS. 1 to 14 of the drawings show a preferred embodiment of the dispenser and component feeder in accordance with the present invention generally designated 10. This dispenser and component feeder 10 is specifically adapted to meet and overcome the problems of storing, orienting, transferring and positioning various odd shaped self-orienting headed components at a depositing point or placement position.

Dispenser and component feeder 10 utilizes a pick-up and positioning assembly 32 which is adapted to engage and position, at precise intervals typically of one to two seconds, a segregated self-orienting or headed component 70 from a single roller feed or transfer assembly, generally designated as 18, to packaging means 71 disposed on conveyor C for associated high speed, automated packaging equipment.

All portions of dispenser and component feeder 10 with which component 70 will be in contact during operation as was above generally described are stainless steel, nylon, or rubber in compliance with the pertinent FDA regulations.

When used herein, the terms self-orienting component or headed component 70 are intended to mean components which have enlarged annular collars or sections 70a either about the head end or adjacent thereto which permit said components 70 to hang by such enlarged annular collars or sections 70a and vertically orient by gravity along the longitudinal axis of the components 70 when engaged on the underside of the collar end of the self-orienting or headed component.

Dispensing and component feeder 10 is shown as including, a storage hopper 11 mounted on housing assembly 80 and having an inlet 12 for charging headed components 70 into storage hopper 11, and a controlled outlet 13 to limit the number of headed components 70 discharged from storage hopper 11.

Storage hopper 11 is vertically disposed at one end of housing assembly 80 by means of support member 15 and has inwardly tapered walls 11a, 11b and 11c and vertical wall 11d which define a compartment 12 in the storage hopper 11 from which components 70 stored therein are dispersed. Controlled outlet 13 is disposed at the lower end of front tapered wall 11a for controlling the discharge of components 70 from the compartment 12 in the storage hopper 11 to linear vibratory chute 16 which communicates with said controlled outlet 13 at the lower end of wall 11a. Operatively included with outlet 13 is sluice gate 14 which is slidably affixed to front tapered wall 11a by means of thumbscrew 14b. Thumbscrew 14b is threadedly connected with front tapered wall 11a through slot 14a disposed in sluice gate 14. In practice, sluice gate 14 is manipulated to adjustably define the size of outlet 13 so as to regulate the rate at which components 70 exit storage hopper 11, all of which is shown in FIGS. 1, 2, 3 and 4 of the drawings.

As is more clearly shown in FIG. 5, back section 16a of linear vibratory chute 16 is located under the storage hopper 11, directly below the controlled outlet 13 and slopes in a downward direction to permit operation by gravity movement. Channels 16b, as defined by the vertical walls mounted on back section 16a, facilitate in isolating and positioning components 70 as they are fed to tapered front section 16c which, in turn, discharges components 70 onto single roller feed and transfer assembly 18. Tapered front section 16c includes pivotally connected gate 16d to facilitate in isolating, stabilizing and discharging onto the adjustable single roller feed and transfer assembly 18 a single self-orienting component at a time.

In order to facilitate the gravity movement for discharging components 70 from chute 16, vibration means 17 is provided on the underside of back section 16a. Vibration means 17 is a simple electro-magnetic vibrator which is fixed in communication with back section 16a by means of a bracket extending from housing assembly 80. The rate at which components 70 are fed from chute 16 to roller feed assembly 18 is partially a function of the frequency at which vibration means 17 is operated and thus, the electro-magnetic vibrator is capable of varying said frequency. Operatively associated with vibration means 17 is photocell sensor 30 supported by member 31, which will be discussed in more detail below, which de-activates the electro-magnetic vibrator when roller feed assembly 18 has no more room for components 70.

Figure 10:
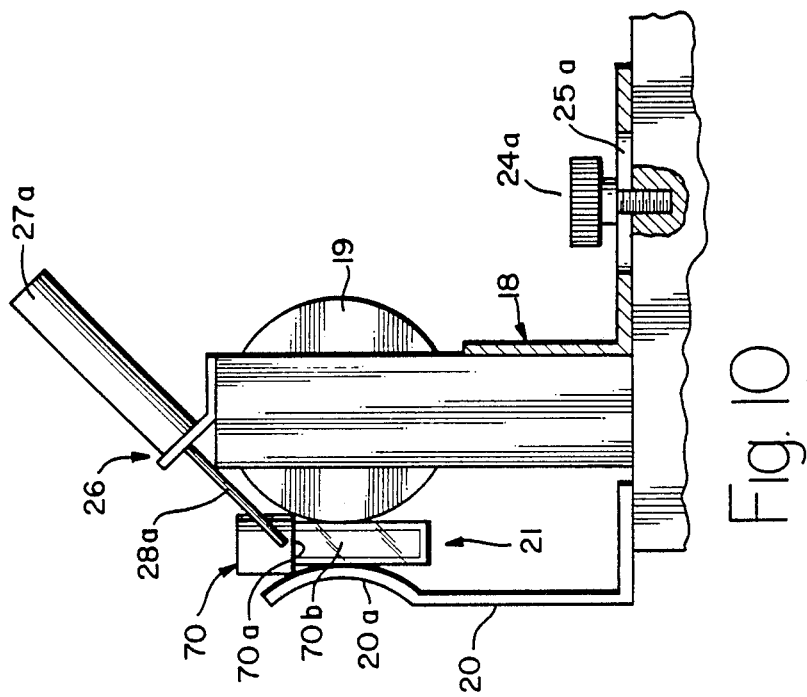
FIG. 10 is an enlarged front view in partial vertical section of the escapement means and roller transfer assembly.

FIGS. 2 and 3 show that single roller feed and transfer assembly 18 is disposed on the upper shaping front section 80a of housing assembly 80 and slopes downwardly at the approximate same obtuse angle of 97° from the vertical axes of storage hopper 11 as the upper sloping section 80a. The single roller feed and transfer assembly 18 has a base member 23 adjustably secured to housing assembly 80 by threaded securing members 24a and 24b. Threaded members 24a and 24b are disposed to extend through adjustment slots 25a and 25b, respectively. FIG. 10 shows the manner in which securing member 24a is threaded into housing assembly 80. Stanchions 22a and 22b rotatably secure a roller 19 to the base 23 also connected to and therefor disposed at the same downwardly sloping 97° angle as the upper sloping front section 80a. When threaded member 24a and 24b are loosened the base 23 and its associated roller 19 can be adjusted within the limits of the slots 25a and 25b.

Adjustment of the single roller feed and transfer assembly 18 is used to size feed gap 21 which is defined by roller 19 and the convex portion 20a of elongated stationary guide wall 20 which is also affixed to housing assembly 80 so as to extend adjacent the longitudinal line of the roller 19. As FIG. 10 shows, feed gap 21 has a bi-concave shape that supports self-orienting components 70 by the underside of annular collar 70a at the upper diverging portion of feed gap 21. When feed gap 21 is properly established, suspended portion 70b of component 70 will be in such close relation to roller 21 and stationary guide wall 20 that the proper alignment of component 70 will be assured as it travels from the upper end of roller feed assembly 18 to escapement means 26 located at the bottom end thereof.

Components 70 are self-orienting by virtue of gravity which ensures their vertical orientation when supported in the above described manner. Further, the suspended portion 70b of component 70 is, in all instances, heavier than the member described as annular collar 70a and therefore, facilitates in vertically orienting component 70 along its longitudinal axis.

It should also be noted that when discharging from the linear vibratory chute 16, component 70 communicates with pivotally connected gate 16d which extends beyond and below the end of tapered section 16c, so as to facilitate in properly aligning and positioning component 70 into feed gap 21 at the upper end of single roller feed and transfer assembly 18.

Figure 8:
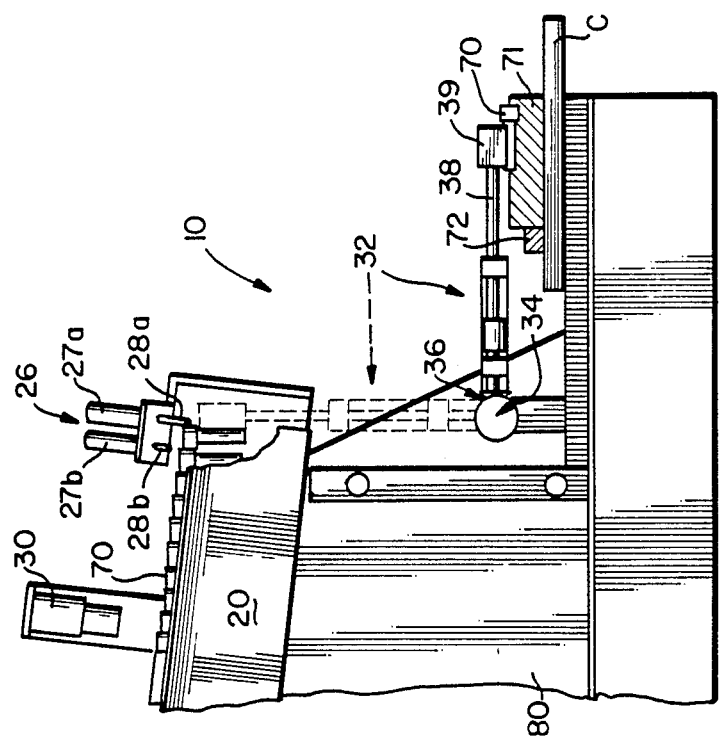
FIG. 8 is an enlarged left side view of the pick-up and placement arm with the associated escapement means.

Roller 19 turns clockwise at a predetermined rate, by means of a motor 19a, which is connected thereto by any suitable means so as to convey component 70 from vibratory chute 16 downwardly to escapement means 26 for engagement with pick-up and place head or vacuum head 39 of the pick-up and position assembly 32. FIGS. 8 and 9 clearly show the manner in which escapement means 26 is associated with pick-up and place head 39 where it implements a hold and release action on component 70.

Thus, escapement means 26 is adjustably mounted on and transverse to the single roller feed and transfer assembly 81 and includes, air cylinders 27a and 27b which have respectively coacting reciprocating rods 28a and 28b, for segregating a single component 70 and permitting the same to escape from the single roller feed and transfer assembly 18 when the pick and place head 39 is in position for engagement with said component 70. As shown in the pneumatic systems diagramatically illustrated in FIG. 13, the air cylinders 27a and 27b each include springs 29a and 29b to maintain reciprocating rods 28a and 28b in the non-escape mode, that is, with reciprocating rod 28a in its fully extended position to prevent component 70 from escaping off of the single roller feed and transfer assembly 18, and reciprocating rod 28b in its fully retracted position so that it does not interfere with any of the components 70 which are moving in feed gap 21.

Figure 11A:
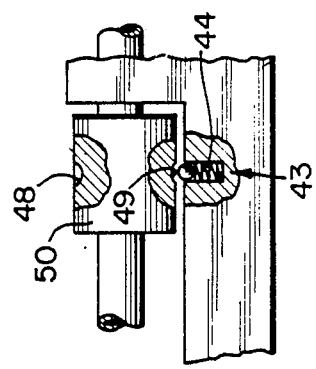
FIG. 11a is a top view of the detent assembly of the pick-up and placement assembly.
Figure 11:
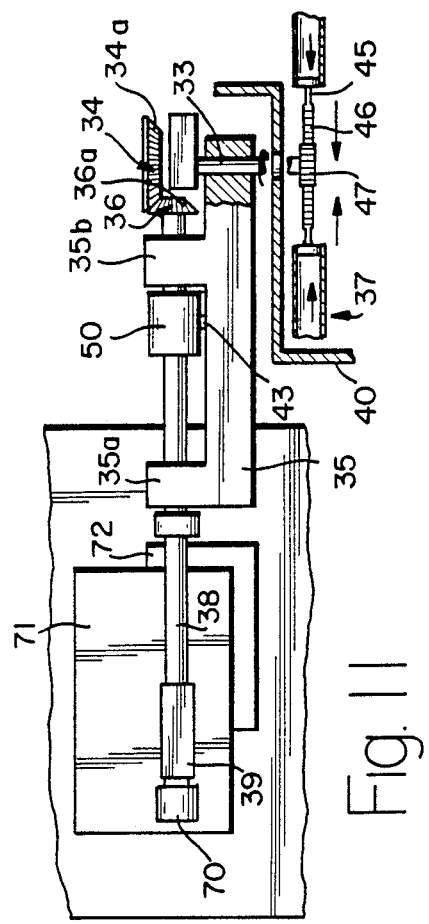
FIG. 11 is a top view of the pick-up and placement assembly for the dispenser and component feeder shown in FIG. 1.
Figure 12:
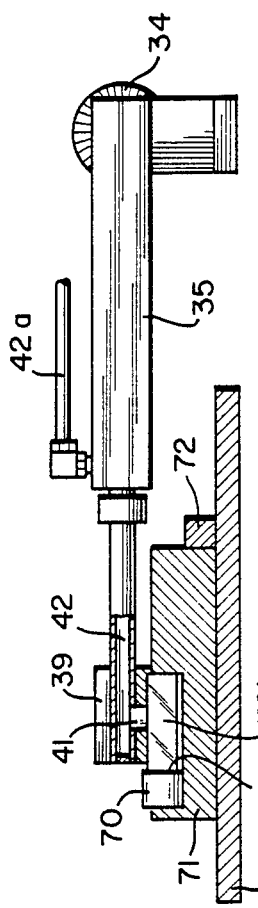
FIG. 12 is a left side view of the pick-up and placement assembly for the dispenser and component feeder shown in FIG. 1.

Pick-up and position assembly 32 includes, swing arm 35 which is pivotally attached to output shaft 33. Pick-up and place arm 38 is rotatably secured in juxtaposition with swing arm 35 by members 35a and 35b which are integrally formed on swing arm 35. During operation, rotary actuator 37 rotates output shaft 33 which in turn pivots swing arm 35 through an arc of 83°, all of which is shown in FIGS. 11 and 12 of the drawings. FIG. 11 further shows that rotary actuator 37 comprises an air actuated reciprocating piston 45 which has medially spaced longitudinal teeth 46 disposed for communication with actuating gear 47 which is fixed to output shaft 33. Thus, as the arrows in FIG. 11 indicate, when air pressure is provided to move reciprocating piston 45 to the left, output shaft 33 will rotate and cause swing arm 35 to pivot from the horizontal non-engaged position to the vertical engaged position, and when air pressure is provided to move reciprocating piston 45 to the right, swing arm 35 will return to its normally horizontal non-engaged position.

The rotation of pick-up and place arm 38 is accomplished by the action of pinion bevel gear 36 which is provided at the lower end of pick-up and place arm 38 and communicates with stationary bevel gear 34 when swing arm 35 is rotated 83° from its normally horizontal non-engaged position to its vertical engagement position adjacent the lower end of the single roller feed and transfer assembly 18.

Thus, pinion bevel gear 36 provides teeth 36a which operatively engage a corresponding set of teeth 34a on stationary bevel gear 34 to provide the required 180° rotation for the pick-up and placement arm 38 to achieve the desired operative relation with the associated packaging system. Stationary bevel gear 34 is aligned with pinion bevel gear 36 so that when swing arm 35 is in its normally horizontal position, teeth 36a of pinion bevel gear 36 are no longer in engagement with teeth 34a on stationary bevel gear 34. Likewise, when swing arm 35 is 83° from the horizontal, or in its generally vertical engagement position, teeth 36a will no longer be in engagement with the teeth 34a. Thus, the teeth 34a on the bevel gear 34 are only operative to rotate pick-up and place arm 38 through 180° so as to facilitate in the engagement and placement of component 70.

To further facilitate in the engagement and placement of component 70 by means of pick-up and place head 39, detent assembly 43 is provided on swing arm 35 adjacent to detent block 50 which is secured to pick-up and place arm 38 for rotation therewith. Thus, after pick-up and place arm 38 has rotated 180° and pinion bevel gear 36 is no longer in engagement with stationary bevel gear 34, detent assembly 43 communicates with indentation 48 when pick-up and place arm is in the pick-up or generally vertical engagement position, and indentation 49 when pick-up and place arm 38 is in the horizontal or placement position. As shown in FIG. 11a, internal spring detent 44 is operative to lock pick-up and place arm 38 in the respective positions so that pick-up and place head 39 will be properly aligned with component 70 being discharged from feed gap 21 or with component package 71 for placement of said component 70. Pick-up and place arm 38 is easily released from the respective locked positions when output shaft 33 turns swing arm 35 causing teeth 36a of pinion bevel gear 36 to once again engage teeth 34a provided on stationary bevel gear 34.

As shown in FIG. 12, pick-up and place head 39 is operatively associated with vacuum tube 42 and has vacuum slot 41 to engage component 70. Convex seat 40, which is more clearly shown in FIG. 9, has a radius of curvature adapted to matingly engage the correspondingly curved outside surface of component 70. It should be noted that pick-up and place head 39 can be easily removed and replaced with a second pick-up and place head 39 so as to accomodate the particular components being dispensed or packaged with dispenser and component feeder 10.

A vacuum pump, vacuum generator or other suitable means creates a vacuum with a minimum pressure head of 20" of mercury for picking up component 70 and maintaining the same within the convex seat 40. Further, vacuum tube 42 is disposed within pick-up and place arm 38 and is associated with the vacuum pump or other suitable vacuum generating means (not shown) by means of air line 42a. Vacuum tube 42 leads to vacuum slot 41 which is of sufficient length and surface area to hold component 70 in convex seat 40 throughout the entire movement of the pick-up and position assembly 32.

Figures 13, 13A:
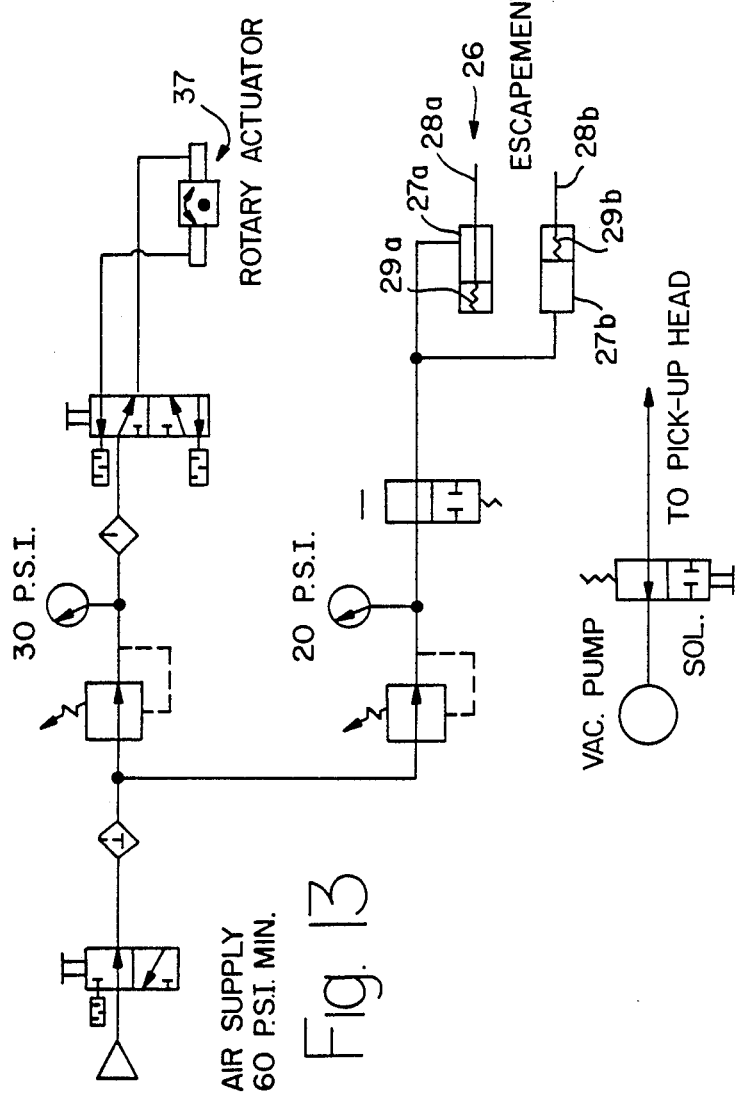
FIG. 13 is a diagrammatic sketch of the pneumatic system for the dispenser and component feeder shown in FIG. 1.
FIG. 13a is a diagrammatic sketch of the pneumatic system for the pick-up and placement assembly shown in the preceding FIGURES.

As the pneumatic system diagramatically shown in FIG. 13 illustrates, air is supplied to the system at a minimum of 60 PSI. The air line supplying air pressure to rotary actuator 37 has within it a pressure regulator so that a pressure of approximately 30 PSI is provided to reciprocate piston 45 and thus rotate output shaft 33 by means of the rack and pinion assembly defined by the rack 46 and actuating gear 47. A solenoid provided in air line to rotary actuator 37 selectively passes the air pressure to opposite ends of piston 45 so as to reciprocate the piston at predetermined intervals. In order to attain the high speed placement sought after with the present invention, the solenoid is operatively associated with the vacuum means so as to provide typical pick-up and placement cycles of 1-2 seconds.

Similarly, the air line providing air to escapement means 26 has a pressure regulator to provide said air at a pressure in the order of 20 PSI. The air pressure governing the operation of escapement means 26 is electrically associated with the air pressure governing the reciprocation of piston 45, as is shown in the electrical diagram in FIG. 14, so that air pressure is realized at escapement means 26 only when rotary actuator 37 turns output shaft 33 to pivot pick-up and place arm 38 into the generally vertical engagement position. Thus, escapement means 26 will permit the engaged component 70 to be released from the single roller feed and transfer assembly 18, and will immediately thereafter return to the non-escape mode to hold subsequent components 70 within the single roller feed and transfer assembly 18, until rotary actuator 37 moves pick-up and place arm 38 back to the generally vertical engagement position once again.

OPERATION OF THE INVENTION

Dispenser and component feeder 10 can be employed alone or integrated with a rotary or linear index table. If feeder 10 is employed alone, it is recommended that a dual configuration be employed by placing two feeders side by side, thus taking advantage of the low-side profile discussed above. In this configuration, two components can be placed or packaged at the same time.

The FIGURES shown herein, however, illustrate dispenser and component feeder 10 as integrated with a table having a linear index conveyor 83.

Initially, feed gap 21 of the single roller feed and transfer assembly 18 is adjusted by manipulating the base 23 so that the roller 19 thereon will be disposed in relation to the stationary guide wall 20 such that the center of feed gap 21 is only slightly larger than the width of suspended portion 70b of component 70. Once feed gap 21 is at the appropriate width to accommodate the particular component 70 to be dispensed, threaded securing members 24a and 24b are tightened to secure feed assembly base 23 to housing assembly 80. The distance between reciprocating rods 28a and 28b is then adjusted to accomodate the width of component 70. The appropriate pick-up and place head 39 is chosen and secured to pick-up and place arm 38 to accomodate component 70.

Storage hopper 11 is then charged with components 70 and sluice gate 14 is adjusted to size hopper outlet 13 which will regulate the discharge of component 70 from hopper 11. The frequency of vibration means 17 is then adjusted to facilitate in conveying component 70 from vibratory chute 16 to the single roller feed and transfer assembly 18. The rate at which roller 19 rotates is also adjusted so as to regulate the feed of component 70 from the upper end of the single roller feed and transfer assembly 18 to the escapement means 26 located at the lower end of roller feed assembly 18.

Once all adjustments have been made, dispenser and component feeder 10 can be energized so that component 70 will exit hopper 11, be vibratorily transferred down chute 16 and onto the single roller feed and transfer assembly 18 where said component 70 will self-orient itself in feed gap 21 and be conveyed to the lower end of the single roller feed and transfer assembly 18 where escapement means 26 will prevent component 70 from exiting.

It should be noted that photocell sensor 30 is operative to de-activate vibration means 17 and thus prevent additional component 70 from being transferred from chute 16 to single roller feed and transfer assembly 18 when said assembly 18 has a sufficient number of components 70 within it to allow operation to continue. This de-activation is accomplished by means of a beam of light which is emitted from photocell sensor 30, and will reflect off the top of a component to indicate that there are a sufficient number of components in assembly 18. To this end, photocell sensor 30 has a logic head with a predetermined time delay so that the component must be stationary beneath the emitted beam of light for a certain amount of time before vibration means 17 will be de-activated. Thus, components which merely pass the emitted beam of light as they are conveyed from the upper end to the lower end of roller feed assembly 18 will not cause vibration means 17 to be de-activated.

The operator of dispenser and component feeder 10 can now activate pick-up and place arm 38 by placing component package or tray 71 into the properly aligned position on conveyor 83. Any suitable means that will effectively activate pick-up and place arm 38 can be employed for coaction with component package 71. The FIGURES contained herein show limit switch 72 with which component package or tray 71 is placed into mechanical contact with to activate pick-up and place arm 38.

Figure 14:
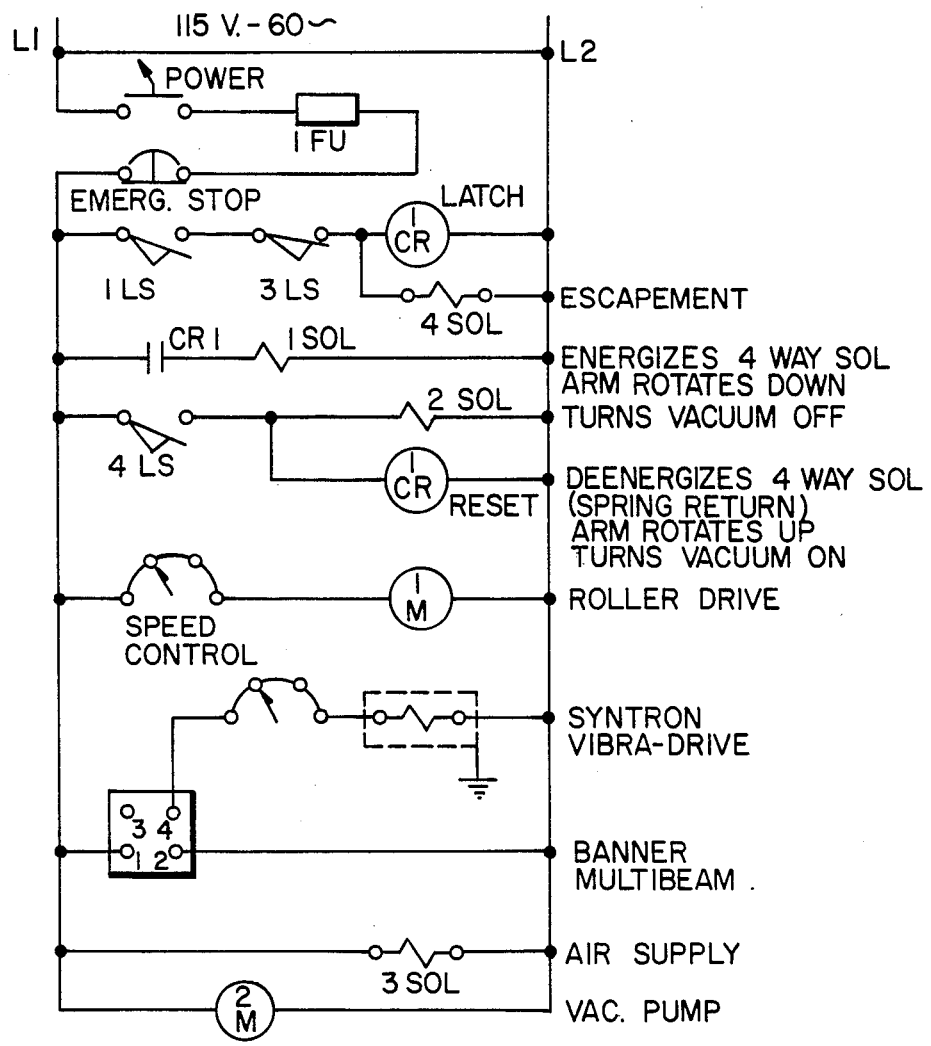
FIG. 14 is a diagrammatic sketch of the electrical system for the dispenser and component feeder shown in FIG. 1.

FIG. 14 clearly illustrates the circuitry involved in activating the various functions performed by dispenser and component feeder 10. Further, each function performed by dispenser and component feeder 10 is clearly labeled in the electrical diagram shown in FIG. 14 so that the circuitry as hereinafter described will become self-explanatory.

Thus, once activated by tray 71, a solenoid permits air at approximately 30 PSI to be supplied to rotary actuator 37 so that reciprocating piston 45 is forced to the left and medially spaced longitudinal teeth 46 engage actuating gear 47 (see FIG. 11). As actuating gear 47 communicates with teeth 46 output shaft 33 rotates thus pivoting swing arm 35 from its horizontal position through an arc of 83° where pick-up and place arm 38 will be in juxtaposition with component 70. Further, as swing arm 35 is being pivoted, pinion bevel gear 36 operatively communicates with stationary bevel gear 34 to rotate pick-up and place arm 38 and thus pick-up and place head 39 a full 180° so that convex seat 40 is properly aligned with component 70.

Pick-up and place head 39 is locked in aligned position by detent assembly 43 as shown in FIG. 11a, as the vacuum pump creates a vacuum at vacuum slot 41. Simultaneously, air pressure in the order of 20 PSI is supplied to escapement means 26 so that rod 28a is retracted within air cylinder 27a thus permitting a single component 70 to be engaged by pick-up and place head 39, and rod 28b is forced out of air cylinder 27b to momentarily prevent the further conveyance of subsequent components 70. FIG. 9 clearly shows the manner in which escapement means 26 operates to permit pick-up and place head 39 to engage a single component 70.

Once component 70 is engaged and secured in pick-up and place head 39, air pressure in the order of 30 PSI applies a force to piston 45 to pivot swing arm 35 to the horizontal or packaging position. The air pressure actuating escapement means 26 is immediately cut-off so that spring 29a will force rod 28a out of cylinder 27a to once again block the exit of or discharge end of the single roller feed and transfer assembly 18, while spring 29b will cause rod 28b to retract within cylinder 27b thus permitting a subsequent component 70 to move into contact with rod 28b.

As swing arm 35 is pivoted towards the packaging position, pinion bevel gear 36 will once again communicate with stationary bevel gear 34 to rotate pick-up and place arm 38 and thus pick-up and place head 39 through 180° where detent assembly 43 will coact with indentation 49 to lock component 70 in alignment with the appropriate compartment in component package or tray 71. Once component 70 is in position within component package or tray 71, the vacuum is deactivated so that component 70 is released into component package or tray 71. Pick-up and place head 39 can now return to roller feed assembly 18 to engage a second component 70 and place it in its respective component package 71 by activating component feeder 10 as described above.

It will be recognized that the simple structure described above permits product changeover in a matter of minutes so that dispenser and component feeder 10 can be employed to package a plurality of various components. Product changeover is accomplished by replacing pick-up and place head 39, adjusting the distance between air cylinders 27a and 27b of escapement means 26, adjusting the roller 19 on the single roller feed and transfer assembly 18 so as to narrow or widen feed gap 21, adjusting hopper outlet 13, and finally, adjusting the speed of roller 19 so that the rate at which component 70 are conveyed is controlled.

Thus, a dispenser and component feeder adapted for automated high speed assembly equipment and capable of handling a wide range of headed components has been described.

It will be understood that the present invention is not to be limited to the specific structure or embodiments shown and described herein but that the same may be modified within the spirit and scope of the invention as defined by the claims which follow immediately below.

What is claimed is:

1. A dispenser and component feeder for high speed placement of self-orienting components comprising
   a. a storage hopper having inlet means for charging quantities of the self-orienting component into the storage hopper, and a controlled outlet means for discharging said self-orienting components,
   b. an adjustable single roller feed assembly having means for adjusting the same to receive and convey self-orienting components of various sizes and shapes,
   c. a linear vibratory chute disposed in communication with said controlled outlet means for vibratorily transferring self-orienting components to said single roller feed assembly at a predetermined rate,
   d. said single roller feed assembly having an upper end disposed to communicate with said vibratory chute, a lower end remote from said upper end, and a roller to facilitate in conveying self-orienting components from said upper end to said lower end by gravity,
   e. escapement means operatively connected to the lower end of the single roller feed assembly to segregate a single self-orienting component for release therefrom, and
   f. a pick-up and placement assembly operatively associated with said escapement means at a pick-up position for moving said segregated self-orienting component including
      i. an operating arm to pivotally move said segregated self-orienting component from the pick-up position to a placement position at a different angular position;
      ii. a vacuum head disposed at the end of said operating arm for picking up said segregated self-orienting component and securing the same during movement of said operating arm;

iii. a gear arrangement operative to align said vacuum head with said segregated self-orienting component at the pick-up position and to position said component for placement simultaneous with the movement of said operating arm; and iv. means for locking said vacuum head in the respective positions established by the gear arrangement.

2. The dispenser and component feeder as claimed in claim 1 wherein the escapement means includes
   i. a first air actuated normally extended rod member for preventing the self-orienting components from escaping the lower end of the roller feed and transfer assembly,
   ii. a second air actuated normally retracted rod member located above said first rod member on the roller feed and transfer assembly, and
   iii. air supply means to cause said first rod member to retract when the pick-up and placement assembly engages the single self-orienting component at the lower end of the roller feed and transfer assembly, and to cause said second rod member to extend to prevent the escape of other self-orienting components on the roller feed and transfer assembly.

3. The dispenser and component feeder as claimed in claim 1 including means for deactivating the vibration of said linear vibratory chute when the roller feed and transfer assembly is full, and for activating the vibration of said linear vibratory chute when the roller feed and transfer assembly has space for additional self-orienting components.

4. The dispenser and component feeder as claimed in claim 1 wherein the placement position is on a conveyor belt having means for actuating the pick-up and placement assembly.

5. The dispenser and component feeder as claimed in claim 1 wherein
   i. said self-orienting components have enlarged annular collars at one end thereof,
   ii. said roller feed and transfer assembly includes a convex guide wall adjacent to the roller to define a bi-convex feed gap to hold self-orienting component by its enlarged annular collar.

6. The dispenser and component feeder as claimed in claim 1 wherein a pneumatically actuated rack and pinion assembly causes the movement of the operating arm of the pick-up and placement assembly.

7. The dispenser and component feeder as claimed in claim 6 wherein the means for locking said vacuum head in the respective positions established by the gear arrangement includes a detent assembly operatively associated with the operating arm of the pick-up and placement assembly.

8. A dispenser and component feeder for high speed placement of self-orienting components comprising
   a. a storage hopper having inlet means for charging quantities of the self-orienting component into the storage hopper, and a controlled outlet means for discharging said self-orienting components,
   b. a sloped single roller feed and transfer assembly having means for adjusting the same to receive and convey self-orienting components of various sizes and shapes,
   c. said single roller feed and transfer assembly having an upper end disposed to communicate with said controlled outlet means, a lower end remote from said upper end, and a roller to facilitate in conveying self-orienting components from said upper end to said lower end by gravity,
   d. a pick-up and placement assembly for engaging at said lower end a single self-orienting component and removing the same to a remote placement position and positioning the same thereat, and
   e. escapement means disposed at the lower end of the single roller feed and transfer assembly to segregate said single self-orienting component for removal from said single roller feed transfer assembly upon engagement by said pick-up and placement assembly with said single self-orienting component on said single roller feed and transfer assembly.

9. The dispenser and component feeder as claimed in claim 8 wherein the placement position is on a conveyor belt having means for actuating the pick-up and placement assembly.

10. The dispenser and component feeder as claimed in claim 8 wherein
    i. said self-orienting components have enlarged annular collars at one end thereof,
    ii. said roller feed and transfer assembly includes a convex guide wall adjacent to the roller to define a bi-convex feed gap to hold the self-orienting component by its enlarged annular collar.

11. A dispenser and component feeder for high speed placement of self-orienting components comprising
    a. a storage hopper having inlet means for charging quantities of the self-orienting component into the storage hopper, and a controlled outlet means for discharging said self-orienting components,
    b. a sloped single roller feed and transfer assembly having means for adjusting the same to receive and convey self-orienting components of various sizes and shapes,
    c. said single roller feed and transfer assembly having an upper end disposed to communicate with said controlled outlet means, a lower end remote from said upper end, and a roller to facilitate in conveying self-orienting components from said upper end to said lower end by gravity,
    d. a pick-up and placement assembly for engaging at said lower end a single self-orienting component and removing the same to a remote placement position and positioning the same thereat, and
    e. said pick-up and placement assembly including
       i. means for engaging and removing said single self-orienting component from said single roller feed and transfer assembly and for releasing the same at said remote placement position,
       ii. means for moving said single self-orienting component from said single roller feed and transfer assembly to said remote placement position, and
       iii. means for aligning said single self-orienting component in relation to said placement position, and
    f. escapement means disposed at the lower end of the single roller feed and transfer assembly to segregate said single self-orienting component for removal from said single roller feed and transfer assembly upon engagement by said pick-up and placement assembly with said single self-orienting component on said single roller feed and transfer assembly, and simultaneously prevent other self-orienting components from escaping said single roller feed and transfer assembly.

12. A dispenser and component feeder for high speed placement of self-orienting components comprising
   a. a storage hopper having inlet means for charging quantities of the self-orienting component into the storage hopper, and a controlled outlet means for discharging said self-orienting components,
   b. a sloped single roller feed and transfer assembly having means for adjusting the same to receive and convey self-orienting components of various sizes and shapes,
   c. a linear vibratory chute disposed in communication with said controlled outlet means for vibratorily transferring at a predetermined rate self-orienting components to said single roller feed and transfer assembly,
   d. said single roller feed and transfer assembly having an upper end disposed to communicate with said controlled outlet means, a lower end remote from said upper end, and a roller to facilitate in conveying self-orienting components from said upper end to said lower end by gravity,
   e. a pick-up and placement assembly for engaging at said lower end a single-self-orienting component and removing the same to a remote placement position, and positioning the same thereat,
   f. said pick-up and placement assembly including
      i. an operating arm for removing said single self-orienting component from said single roller feed and transfer assembly to said remote placement position,
      ii. said operating arm having means for engaging and removing said single self-orienting component from said single roller feed and transfer assembly and securing the same during movement of said operating arm, and
      iii. means for aligning said single self-orienting component with said remote placement position, and
   g. escapement means disposed at the lower end of the single roller feed and transfer assembly having alternately reciprocating rods to selectively segregate a single self-orienting component for removal from said single roller feed and transfer assembly upon engagement by said pick-up and placement assembly with said single self-orienting component on said single roller feed and transfer assembly, and simultaneously prevent other self-orienting components from escaping from said single roller feed and transfer assembly.

13. A pick-up and placement assembly for moving a component from a first position to a second position in a different plane from said first position comprising
   a. base means,
   b. a stationary gear connected to said base means,
   c. an operating arm pivotally connected to said base means adjacent the stationary gear,
   d. gear means connected to the end of said operating arm for operative engagement with the stationary gear to rotate said operating arm during movement thereof,
   e. a vacuum head on the end of said operating arm for engaging said component at said first position and for holding the same during movement of said operating arm,
   f. actuating means for moving said operating arm from said first position to said second position in a different place from said first position, including
      i. a rack and pinion assembly having a reciprocating rack and an actuating gear operatively connected to said operating arm remote from said vacuum head,
      ii. said reciprocating rack having air pistons connected at both ends, and
      iii. air supply means to selectively provide air pressure in said pistons to effect the reciprocating action of the rack,
   g. means for rendering said vacuum head inoperative when said operating arm moves to said second position to release the component at said second position.

14. The pick-up and placement assembly as claimed in claim 13 wherein a detent assembly is connected to the operating arm for locking the vacuum head at the first position during engagement of the component.

15. The pick-up and placement assembly as claimed in claim 14 wherein the detent assembly locks the vacuum head at said second position during the release of the component thereat.

* * * * *